United States Patent [19]

Klein et al.

[11] 3,825,859

[45] July 23, 1974

[54] MINIMUM INSERTION LOSS YIG PULSE COMPRESSION FILTER TRANSDUCER

[75] Inventors: Gerald I. Klein, Westbury, N.Y.; Robert A. Moore, Severna Park; Stephen F. Payer, Glen Burnie, both of Md.

[73] Assignee: Westinghouse Electric Corporation, Pittsburgh, Pa.

[22] Filed: May 25, 1972

[21] Appl. No.: 257,052

Related U.S. Application Data

[63] Continuation of Ser. No. 80,390, Oct. 30, 1970, abandoned, which is a continuation of Ser. No. 809,672, March 24, 1969, abandoned.

[52] U.S. Cl. ................................ 333/30 M, 333/33

[51] Int. Cl. .......................... H03h 9/30, H03h 9/34

[58] Field of Search .... 333/24 G, 24.2, 30 R, 30 M, 333/31 R, 33, 34, 35, 97 R

[56] References Cited

UNITED STATES PATENTS

| | | | |
|---|---|---|---|
| 2,524,183 | 10/1950 | Wheeler | 333/35 X |
| 2,881,399 | 4/1959 | Leyton | 333/34 X |
| 3,289,112 | 11/1966 | Brown | 333/24.2 |
| 3,384,841 | 5/1968 | Di Piazza | 333/31 R |

*Primary Examiner*—Paul L. Gensler

*Attorney, Agent, or Firm*—J. B. Hinson

[57] ABSTRACT

The present invention relates generally to a broad band delay line utilizing magnetoelastic coupling and propagation of acoustic waves. Microwave pulse compression is effected by an axially magnetized YIG rod. The YIG rod performs the function of a wide band dispersive delay line having a monotonically increasing delay versus frequency characteristic. Pulse compression is effected by differentially delaying the successive instantaneous frequency components of a swept input pulse. Insertion loss is maintained less than 20 db from 1.0 to 3.0 GHz and as low as 7 db.

3 Claims, 4 Drawing Figures

MINIMUM INSERTION LOSS YIG PULSE COMPRESSION FILTER TRANSDUCER

This is a continuation of application Ser. No. 080,390 filed Oct. 30, 1970, now abandoned.

This is a continuation of application Ser. No. 809,672, filed Mar. 24, 1969, and now abandoned. Broadly stated, the present invention, to be described in greater detail, is directed to the reduction of insertion loss in a broad band variable delay line utilizing magneto elastic coupling and propagation of acoustic waves.

In wide ban microwave pulse compression, in axially magnetized ferromagnetic signal crystal material such as yttrium-iron-garnet, commonly called YIG, may be used. The YIG rod performs the function of a wide band dispersive dealy line with a monotonically increasing delay versus frequency characteristic. Pulse compression is effected by differentially delaying successive instantaneous frequency components of a swept input pulse.

In fabricating a delay line for pulse compression at microwave frequencies, a major requirement is reduction of insertion loss to as low in value as possible over a band width of the order of 500 MHz. Bandwidths of this order are necessary for high resolution of the compressed pulse, e.g., for pulsewidths less than nanoseconds. If, becuase of poor delay line insertion loss, the compressed pulse amplitude is extremely small, a large amount of noise is introduced into the system due to the necessary introduction of a series of wide band pulse recovery amplifiers. Such an arrangement limits the operating dynamic range of the system and offsets much of the effectiveness of a high resolution output. In addition, the recovery amplifiers add to the expense of the system.

In one form of a known YIG acoustic delay line, RF input energy is coupled into the YIG rod by means of a tuned wavequide cavity which is inherently narrow band. Other known arrangements of YIG acoustic delay lines utilize a fine wire RF conductor which is placed near the YIG rod for effecting magnetoelastic coupling. The wire is formed in a loop and adds an undesirabe reactive component to the impedance of the system that serves to reduce available source current.

These and other disadvantages are overcome by the present invention which has for its primary object to provide a broad band YIG delay line having an improved insertion loss characteristic over known prior art arrangements.

Another object of the present invention is to provide a minimum loss broad band delay line having an improved dynamic range over known prior art arrangements, while simultaneously reducing the cost of fabrication.

A further object of the present invention is to provide a coupling circuit for a magneto elastic delay line having low insertion loss and broad band match to the delay line crystal.

In carrying out the present invention, in one form thereof, energy propagation through a YIG delay line is induced by applying a microwave RF field perpendicular to the YIG rod axis with a steady magnetic field applied parallel to the axis. Transduction of RF energy to spin wave energy takes place at a point near the end of the rod and transduction efficiency is directly proportional to the RF magnetic field strength at the location of the rod end. Insertion loss is minimized by matching the transducer to the equivalent spin wave plus conversion loss resistance of the delay line. High current is attained by short circuiting the RF line and the end of the YIG rod is placed adjacent the short circuit or high current point. By controlling the RF line dimensions and dielectric materials so that the characteristic impedance of the RF input line or transducer in the vicinity of the YIG crystal is approximately 18 ohms, the insertion loss is minimized over that obtainable by a 50 ohm short circuit termination.

Figure 1:
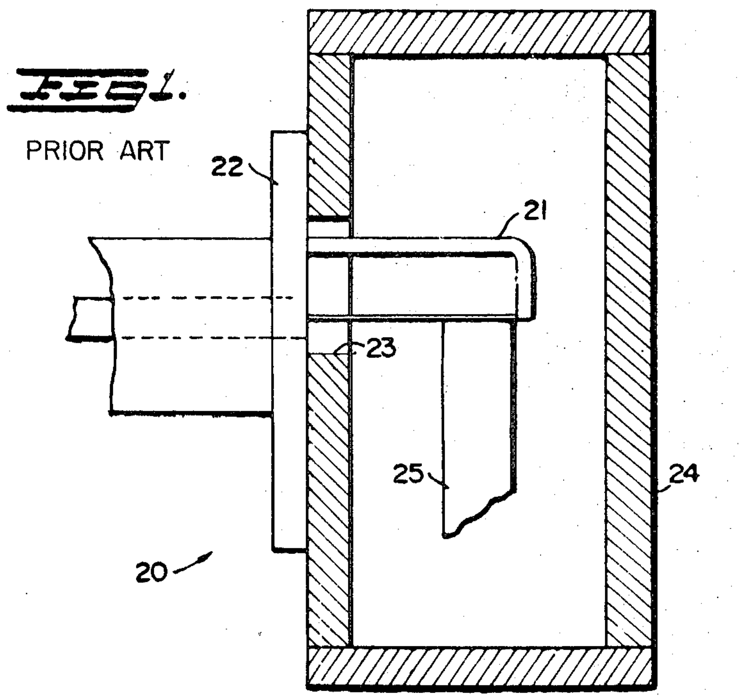
FIG. 1. PRIOR ART
FIG. 1 is a cut-away view of fine wire loop RF transducer.

The theory of operation of YIG delay lines is well known and will not be described in detail herein. For a detailed description of the operation of such devices, reference may be had to U.S. Pat. No. 3,309,628. Briefly, a microwave input signal produced in a YIG rod by an RF coupling loop of frequency $W = \gamma H$ ($\gamma = 2.8 \times 10^6$Hz/Oersted) couples to a magnetic dipole moment existing due to a nonuniform field $H$ to establish a magnetic precessional moment a position along the rod. This corresponds to exciting a long wave length spin wave. As the spin wave propagates from left to right, the field $H$ decreases sharply at the edge of the input coupling assembly and the spin wave becomes an acoustic wave due to magnetoelastic coupling. From the position corresponding to the edge of the strong magnetic field of the input coupling assembly, the acoustic wave travels along the rod at the appropriate acoustic velocity to the output coupling assembly. The acoustic wave converts by reverse order to a spin wave and the spin wave motion creates an $H_{RF}$ which is picked up by the loop of the output coupling assembly and coupled out as an output pulse delayed relative to the input signal by a factor proportional to the acoustic velocity within the YIG rod.

In a copending application of Gerald I. Klein and Stephen F. Payer, U.S. Ser. No. 809,568, filed concurrently herewith assigned to the assignee of the present invention and now abandoned in favor of a continuation application Ser. No. 080,307, filed Oct. 30, 1970 and now abandoned, there is disclosed a "fine-wire" RF transducer of the type shown in FIG. 1. The RF transducer 20 comprises a short circuited loop 21, which includes a small diameter wire, which is a continuation of the center conductor of the coax cable of the transducer 20. Loop 21 is attached at one end to a conventional connector 22 through access opening 23 of holder 24. YIG rod 25 is conveniently mounted in holder 24 so that its flat end face is parallel and in contact with the fine wire.

Due to the inductance of the loop, the impedance as seen by the source includes a reactive term. The magnitude of this reactive term is larger than the reactance which would be presented to the source if the coupling region of the line had a 50 ohm characteristic impedance. This large reactance limits available current and reduces the spin wave conversion efficiency which is directly proportional, within defined limits, to the magnitude of the RF current in the coupling region. Loss measurements for such a "fine-wire" loop transducer vary with the gauge of the loop. Typical "best" losses range from 58 to 65 db between 2.2 and 2.8 GHz for a time delay of 1.5 microsec.

Figure 2:
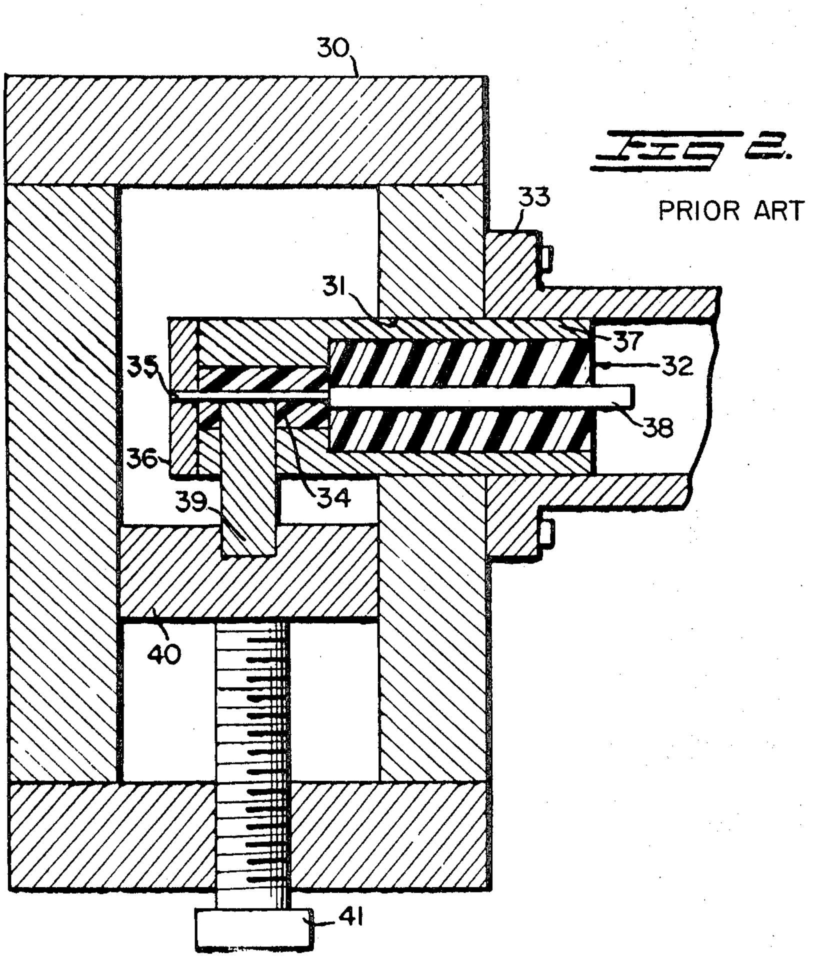
FIG. 2. PRIOR ART
FIG. 2 is a view, partially in cross section, of a broad band YIG rod holder assembly.

An improvment over the "fine wire" transducer wherein the overall delay line insertion loss is significantly reduced to a value of approximately 22.5 db for a 1 microsec. time delay at a frequency of 2.2 GHz is disclosed in FIG. 2. A reduction in insertion loss is attained by placing the end of the YIG rod at a high current point of the RF input line which is attained by short circuiting the RF line and placing the end of the YIG device near this short circuit. By selecting the RF line dimensions and dielectric material so that the characteristic impedance of the RF input lines is 50 ohms up to the short circuit point, RF current is increased in the vicinity of the YIG rod. The details of construction and operation of the transducer shown in FIG. 2 is also disclosed in the aforementioned copending application.

Referring to FIG. 2, the YIG rod holder assembly comprises housing 30 which includes in one side an opening 31 through which passes a 50 ohm coaxial cable 32. Cable 32 is conveniently supported by conventional coax connector 33 mounted over the opening. The dielectric 34 in the vicinity of the YIG rod is chosen to have a dielectric constant as close as possible to that of the YIG itself. Advantageously, a dielectric having a dielectric constant of 15 is used to match the dielectric constant of the YIG rod. The fine wire center conductor 35 of cable 32 is short circuited to outer conductor 37 by conductor 36 which may be in the form of a disc. The inner diameter of the outer conductor is chosen to provide a 50 ohm characteristic impedance in this section of the line. Suitable measurements are an outer diameter of 0.010 inch for fine wire center conductor 35 and an inner diameter of 0.254 inch for the outer conductor 37. In the vicinity of port 31, the dimensions are chosen such that center conductor 38 has a diameter of 0.120 inch, while the inner diameter of the outer conductor 37 is 0.424 inch.

YIG rod 39 is mounted on a sliding end plate 40 which positions the rod through rotatable screw device 41 so that the end face of the rod is parallel to the inner conductor 35 and in contact therewith. While the input impedance presented to the driving source has a reactive component, the magnitude of the component is considerably decreased from the value incurred in a non-50- ohm system and current available to the rod is maximized, thereby minimizing overall insertion loss. Best insertion loss achievable with such a construction is approximately 20 db at 1–6 GHz for a time delay of 1.0 microsecond. In accordance with the present invention, the insertion loss is further reduced by approximately 10 db. This is achieved by matching the transducer to the equivalent spin wave plus conversion loss resistance of the delay line.

Figure 3:
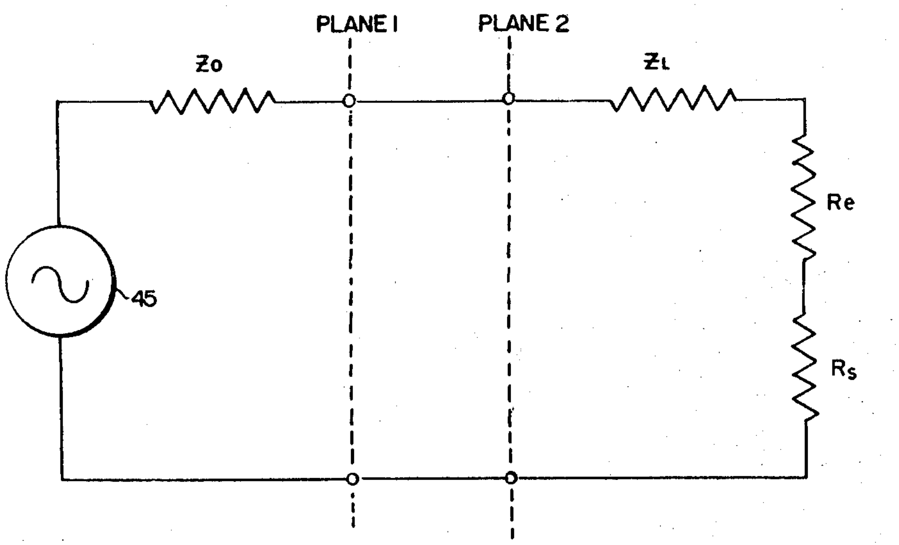
FIG. 3 is an approximate equivalent circuit for a pulse compression RF transducer.

Coupling to the YIG delay line in the magnetoelastic mode can be described in terms of the approximate equivalent circuit for the pulse compression RF transducer illustrated in FIG. 3. The source 45 is shown as a Thevinin generator equivalent circuit. The load shown to the right of plane 2 consists of $R_s$, the equivalent spin wave radiation resistance $R_e$, which is a resistor whose $I^2Re$ value characterizes the RF to spin wave conversion loss, and $Z_L$ the impedance due to the leakage inductance of the transducer. From FIG. 3 it should be apparent that the configuration described in the aforementioned copending application, while minimizing leakage inductance, fails to match the transducer to the equivalent spin wave plus conversion loss resistance of the delay line.

An approximate value for $R_s$ can be calculated from insertion loss data in accordance with the following relations:

$$I_L = 2 \times 10 \log P_i/P_t + A \text{ db}, \quad (1)$$

$$P_i/P_t = (Z_o/R_s + 1)^2/4\ Z_o/R_s \quad (2)$$

where $I_L$ is overall insertion loss of the delay line in db, $A$ is the spin wave transmission attenuation in db, $P_i$ is the available power at the input port of the delay line (plane 2 in FIG. 1 with $z_L$ assumed negligible) $P_t$ is the power in the induced spin wave and $Z_o$ is the characteristic impedance. $I_L$ is a measured quantity and $A$ is calculated from the expression:

$$A = (2f + 3)\ T \text{ db}, \quad (3)$$

where $f$ is the carrier frequency in GHz and $T$ is a delay time in microseconds. The factor 2 appears in the first term on the right hand side of the Equation (1) because of the identity of input and output ports of the device in which insertion loss is measured. In addition, Equations (1) and (2) assume that only input and output losses are due to mismatch. Under these restrictions, a value for $R_s$ can be shown to be approximately equal to b 3.0 ohms.

By taking VSWR measurements at a location equivalent to plane 1 of FIG. 1, it has been found that the effective resistance of plane 2 is actually in the order of 3.8 ohms. Thus, a value for $R_e$ of the order of 0.8 ohms is practicable. Further, optimum minimization of insertion loss can be achieved by matching the transducer to a value of approximately 4 ohms while retaining the configuration which provides minimum leakage reactance. It can be shown that achievement of a 4 ohm input transducer while retaining the required coaxial geometry in the vicinity of the YIG crystal for a variable time delay requires a very high dielectric constant material in the transducer.

Figure 4:
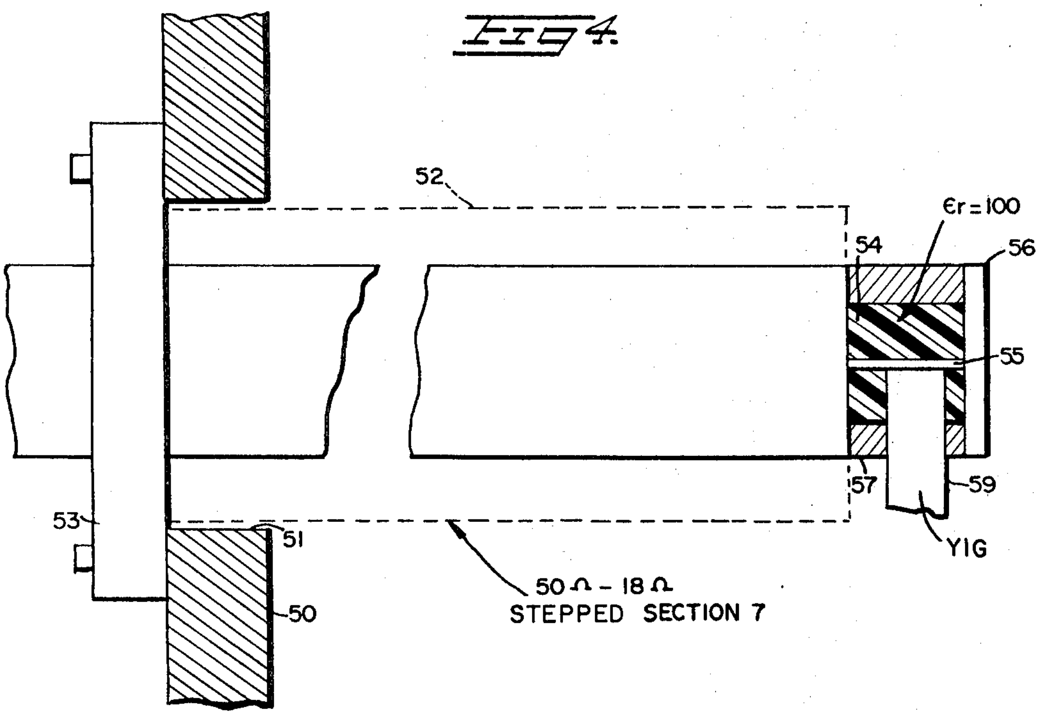
FIG. 4 is a partial elevational view partially in cross section, of a minimum insertion loss YIG pulse compression filter transducer embodying the present invention.

A transducer having a characteristic impedance equal to 18 ohms in the vicinity of the YIG crystal can be constructed where titanium dioxide is used as a dielectric surrounding the inner conductor of the coaxial line. Such an arrangement is shown in FIG. 4 wherein the YIG rod holder assembly comprises a housing 50 which includes in one side an opening 51 through which passes coaxial cable 52. Cable 52 is conveniently supported by a conventional coax connector 53 mounted over the openign in the housing. The section of the coaxial line adjacent the opening and within the housing consists of a 50 ohms to 18 ohms stepped broad band matching section. The dielectric 54 of coax cable 52 in the vicinity of the YIG rod 59 is chosen to have a dielectric constant of approximately 100 and may be, for example, titanium dioxide.

Fine wire center conductor 55 of cable 52 is short circuited by conductive element 56 to outer conductor 57. The dimensions of the inner diameter and the outer diameter of the inner conductor are maintained to provide minimum leakage conductance. Suitable measurements are an outer diameter of 0.010 inch for the fine wire center conductor 55 and an inner diameter of 0.200 inch for the outer conductor 57. YIG rod 59 may be advantageously mounted on a sliding end plate in the manner shown in FIG. 2 to position the rod through a rotatable screw device so that the end face of the rod is parallel to the inner conductor 55 and in contact therewith.

The use of the titanium dioxide dielectric in the embodiment described enables a 7 db reduction of insertion loss over a transducer using a low value dielectric. To obtain an exact match for the dimensions shown in FIG. 4, a dielectric greater than 2000 is necessary. An approximate match may be achieved through the use of a barium titanate dielectric having a dielectric constant approximately equal to 1,000 and a mismatch power loss of only 0.34 db is experienced. An insertion loss of 13 db has been obtained using a coaxial transducer incorporating titanium dioxide dielectric while an insertion loss of only 8.6 db was obtained when a barium titanate dielectric was used.

We claim as our invention:

1. A coupling circuit for a magnetoelastic delay line comprising in combination:

a. transducer means for coupling an electrical signal to a magnetoelastic sample, comprising a section of coaxial transmission line which is terminated at the first end by an electroconductive disk which connects the inner and outer conductors of said coaxial transmission line, said coaxial transmission line further including an opening in the outer conductor and the insulation separating the conductors of said transmission line, said opening having dimensions which permit a gyromagnetic sample, which is a part of a magnetoelastic delay line, to be positioned such that a portion of said gyromagnetic sample is adjacent the inner conductor of said transmission line; and b. a coaxial matching section having a first end coupled to the second end of said transmission line section with the second end of said matching section forming the input terminals of said coupling circuit.

2. A coupling circuit in accordance with claim 1 wherein the dielectric material separating the inner and outer conductors of said section of transmission line is titanium dioxide.

3. A coupling circuit in accordance with claim 2 wherein the input impedance to said section of coaxial transmission line is in the vicinity of 18 ohms.

* * * * *